(12) United States Patent
Smith

(10) Patent No.: US 11,623,223 B2
(45) Date of Patent: Apr. 11, 2023

(54) CHIPPER ADAPTER SYSTEM AND METHOD

(71) Applicant: Wayne J. Smith, Brookhaven, MS (US)

(72) Inventor: Wayne J. Smith, Brookhaven, MS (US)

( * ) Notice: Subject to any disclaimer, the term of this patent is extended or adjusted under 35 U.S.C. 154(b) by 262 days.

(21) Appl. No.: 17/034,048

(22) Filed: Sep. 28, 2020

(65) Prior Publication Data

US 2022/0097075 A1 Mar. 31, 2022

(51) Int. Cl.
| B27L 11/00 | (2006.01) |
| B02C 23/04 | (2006.01) |
| A01G 3/00 | (2006.01) |
| B27L 11/02 | (2006.01) |
| B27L 11/08 | (2006.01) |

(52) U.S. Cl.
CPC ............. *B02C 23/04* (2013.01); *A01G 3/002* (2013.01); *B27L 11/00* (2013.01); *B27L 11/005* (2013.01); *B27L 11/02* (2013.01); *B27L 11/08* (2013.01); *B02C 2201/066* (2013.01)

(58) Field of Classification Search
CPC ....... A01G 3/002; B27L 11/00; B27L 11/005; B27L 11/02; B27L 11/04; B27L 11/06; B27L 11/08; B02C 2201/066
See application file for complete search history.

(56) References Cited

U.S. PATENT DOCUMENTS

| 6,474,579 | B1 * | 11/2002 | Bardos | B02C 13/095 241/285.2 |
| 7,481,386 | B2 * | 1/2009 | Hartzler | B02C 25/00 241/34 |
| 8,061,640 | B2 * | 11/2011 | Cotter | B02C 18/18 241/189.1 |
| 8,602,333 | B2 * | 12/2013 | Bradley | B02C 18/2291 241/37.5 |

* cited by examiner

*Primary Examiner* — Matthew Katcoff
(74) *Attorney, Agent, or Firm* — Laurence P. Colton; Smith Tempel Blaha LLC

(57) ABSTRACT

An adapter method and system includes a first side deflector, a second side deflector, and a top deflector coupled to the first side deflector and the second side deflector. The system may further include an internal deflector coupled to the first, second, and top deflectors. A first leg is coupled to the first side deflector and a second leg is coupled to the second side deflector. The legs are adjustable between a first position and a second position. The first, second, and top deflector define an entrance region for channeling wood-based debris into the chute of a woodchipper. Each side deflector may include a coupling mechanism for attaching to a woodchipper. Each coupling mechanism has an aperture. Each leg may telescope within a respective side deflector.

10 Claims, 14 Drawing Sheets

CHIPPER ADAPTER SYSTEM AND METHOD

BACKGROUND OF THE INVENTION

Technical Field

This invention is generally directed to a device and system for adapting or channeling cut trees and related tree parts into a woodchipper in forward and reverse directions. In addition, this invention is directed to a device and system that may be coupled to a woodchipper during operation of a woodchipper and while the woodchipper is in a non-operational state and being transported from one location to another. This invention is more specifically directed to a device and system that allows for the reverse feeding of trees and tree limbs into a chipper and to and protect a chipper from damage that can be caused by feeding trees and tree limbs into the chipper. In addition, this invention is directed to a device and system that reduces or eliminates human and/or manual labor in operating a chipper as the device and system does not require manual feeding. Further, this invention is directed to a device and system that protects the components of the chipper, including the safety components of the chipper.

Background on Woodchippers

Woodchippers or tree chippers are devices that can chip, cut, and/or grind tree branches, tree limbs, and tree trunks into wood chips. These machines are very useful for clearing wooded areas and help to substantially reduce debris volume when trees are cut down.

However, it is well known that woodchippers can be dangerous to human operators when human operators feed tree branches, tree limbs, and/or tree trunks into the woodchippers. Arms and hands of human operators are at risk of being injured by woodchippers when woodchippers are being fed by human operators.

What is needed in the art is a device and system that protects the chipper and chipper components from being damaged from the feeding of limbs in a reverse direction, that is, in a leaf-to-limb or thinner-to-thicker limb manner direction. What also is needed in the art is a device and system that may reduce and/or eliminate human operators physically handling or physically feeding tree parts into woodchippers. What additionally is needed is a system that may allow for lifting machines or handling machines, such as skid steers, frontend loaders, tractors, etcetera, that can be used to feed tree parts into woodchippers without any direct handling of tree parts by humans. This invention addresses these and other needs.

A further need exists in the art that allows tree parts to be fed into woodchippers in at least two directions relative to tree growth: (a) in a limb-to-leaf or thicker-to-thinner limb (normal/forward) manner and (b) a leaf-to-limb or thinner-to-thicker limb manner (inverted/reverse) manner. That is, there is a need in the art that allows for forward and reverse feeding of tree parts into woodchippers. This invention also addresses this and other needs.

BRIEF SUMMARY OF THE INVENTION

An adapter device and system may comprise a first side deflector, a second side deflector, and a top deflector coupled to the first side deflector and the second side deflector, so as to form a generally inverted U-shaped device for placement in front of the mouth of a woodchipper. The device and system may further include an internal deflector coupled to the first, second, and top deflectors. Additionally, a first leg is coupled to the first side deflector and a second leg is coupled to the second side deflector. The legs are adjustable between at least a first position and a second position so as to brace the device on the ground and to help support the weight of the chipper to which the device is attached. The first side deflector, the second side deflector, the top deflector, and the internal deflector define an entrance region for channeling wood-based debris into the chipper and for protecting the components of the chipper from the wood-based debris being fed into the chipper.

Each side deflector may comprise a coupling mechanism for attaching to a woodchipper. Each coupling mechanism may comprise an aperture. Each leg may telescope within a respective side deflector so as to allow for transferring the weight of the chipper from the chipper wheels to the chipper adapter legs so as to stabilize the chipper and the chipper adapter on the ground. Each leg may comprise a plurality of apertures for locking or retaining the leg in a certain position or height. Each leg may be received by a fixed, telescoping support holder, and each fixed, telescoping support holder may include an aperture. The aperture of each fixed, telescoping support holder may align with an aperture present within a leg, and a pin may be placed through the aligned apertures of the telescoping support holder and the leg to retain or lock the leg in place or position in the telescoping support holder relative and relative to the device. The first side, second side, and top deflectors may have curved surfaces, or a series of flat surfaces arrange generally in an arc-like manner to as to mimic a curved surface.

The features disclosed herein are intended to provide the basis for the chipper adapter device, a system comprising the chipper adapter device and other components, such as, but not limited to, a chipper, and a method for using the chipper adapter device and the system. These features, and other features and advantages of the present invention will become more apparent to those of ordinary skill in the relevant art when the following detailed description of the preferred embodiments is read in conjunction with the appended drawings in which like reference numerals represent like components throughout the several views.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The features and advantages of the invention will become apparent from the following description taken in connection with the accompanying drawings in which.

DETAILED DESCRIPTION OF PREFERRED EMBODIMENTS

Figure 1B:
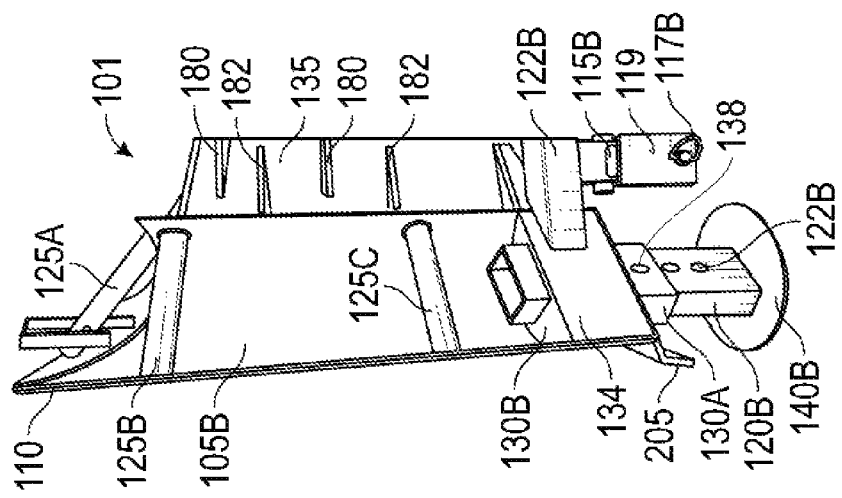
FIG. 1B is a right side view of the adapter device of FIG. 1A according to one exemplary embodiment of the inventive device.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures, e.g., use of "102" alone encompasses "102A" and "102B".

Figure 1A:
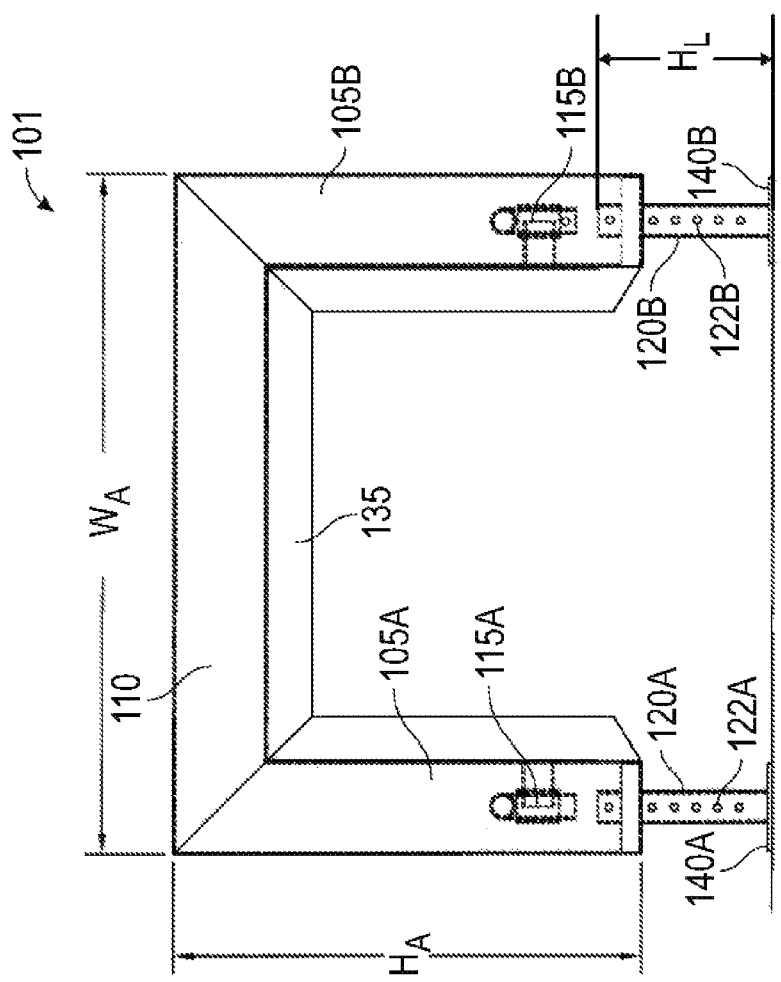
FIG. 1A is a front view of a chipper adapter device for a woodchipper according to one exemplary embodiment of the inventive device.

Referring now to the drawings, wherein the showings are for purposes of illustrating the various embodiments of the present disclosure only and not for purposes of limiting the same, as seen in FIG. 1A, this figure is front view of an adapter system 101 for a woodchipper according to one exemplary embodiment of the inventive system 101. The adapter system 101 may comprise a top branch deflector 110, two side branch deflectors 105A, 105B, and an optional internal branch deflector 135 (see FIGS. 1B and 1C). For the remaining of this disclosure, the branch deflectors 105, 110, and 135 will be referred to generally as "deflectors".

Each side deflector 105 may further comprise a chipper coupling mechanism 115 as well as extendable legs 120. Each leg 120 may have apertures 122 so that each leg 120 may be set or fixed at a leg height (HO) with a pin 149 (see FIG. 2C). The leg height (HO) is adjustable and may range up to at least 36.0 inches so as to allow the leg 120 to be raised or lowered from relative to deflectors 105A and 105B so as to brace the system 101 on the ground to support the weight of the chipper and/or to transfer the load of the chipper from the chipper wheels to the legs 120. However, other magnitudes for the extendible legs 120 are possible and are included within the scope of this disclosure. The range for the leg height (HO) is dependent on the height of the chute 200 (see FIG. 2A) of the woodchipper 400 (see, e.g., FIGS. 6A and 6B) to which the adapter system 101 may be attached relative to the ground (as described below). Further, the range for the leg height (HO) also is dependent on the manufacturer, brand, and style of woodchipper, as different woodchippers have different dimensions.

Each side deflector 105 may comprise a height (HA) between about 40.0 and 85.0 inches, more preferably between about 50.0 and 75.0 inches, and preferably about 65.0 inches. The top deflector may comprise a width (WA) between about 30.0 and 120.0 inches, more preferably between about 60.0 and 110.0 inches, and preferably about 95.0 inches. The side deflectors 105 and top deflector may have a width dimension (Wo) between about 4.0 and 20.0 inches, more preferably between about 6.0 and 15.0 inches, and preferably about 12.0 inches. Again, the sizes/dimensions mentioned in this disclosure are exemplary only, and are usually dependent on the size of the woodchipper to which the system 101 attaches and/or the type and size of tree or wood that is to fed into the woodchipper.

More specifically, the system 101 can be manufactured and supplied ins different sizes corresponding to the various different brands of chippers. For example, each chipper manufacturer offers chippers of different sizes and configurations, and the system 101 can be constructed to correspond and cooperate with each different size and configuration. In other words, for Brand A, Chipper Model 1, a version of the system 101 can be sized and configured to fit on and work with this model A/1, while for Brand B, Chipper Model 2, a different version of the system 101 can be sized and configured to fit on and work with this model B/2. It is also contemplated that a version of the system 101 can be produced that will fit and work with a plurality of brands and models, and/or be adjustable to fit and work with a plurality of brands and models.

The deflectors 105, 110, and 135 may be constructed from metal, such as, but not limited to, steel and/or iron. However, other materials are possible and are included within the scope of this disclosure. Other materials may include, but are not limited to, composites, other metal alloys, and the like.

Figure 7A:
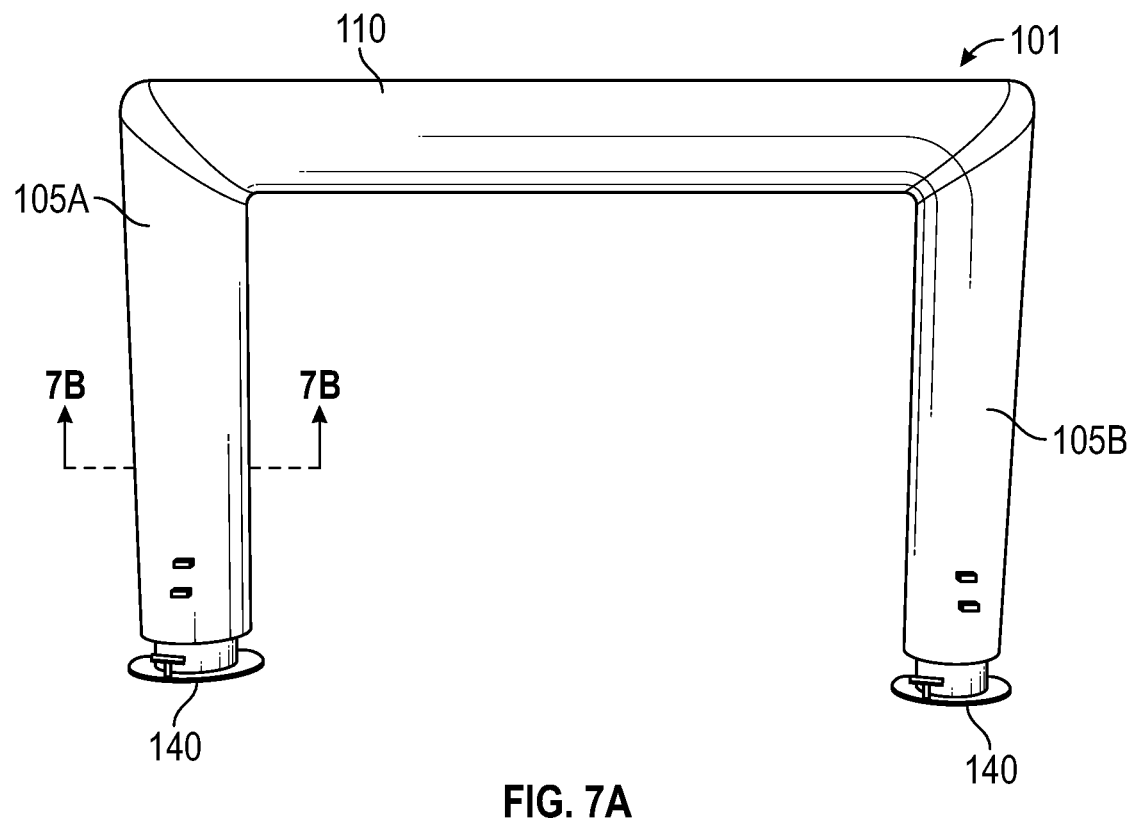
FIG. 7A is a front view of the adapter device of FIG. 1A with a smooth curved structure.
Figure 7B:
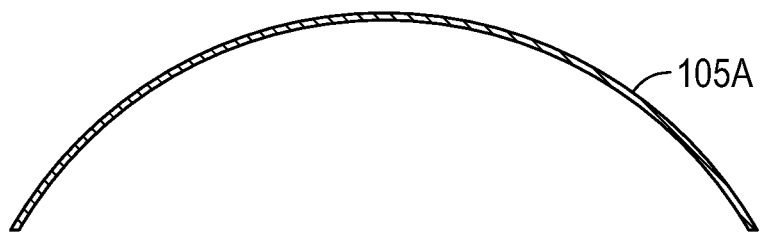
FIG. 7B is cross-section of the left side deflector of the adapter device of FIG. 7A along line A'-A'.

According to one exemplary embodiment, one or more of the side deflectors 105 and top deflector 110 may be constructed from steel pipe, such as 8.0 inch to 15.0 inch diameter steel pipe and more preferably 12.0 inch diameter steel pipe, where each pipe is cut in one-half (see e.g., FIGS. 7A and 7B). According to another exemplary embodiment, one or more of the side deflectors 105 and the top deflector 110 may be formed from a sheet of metal by bending the sheet of metal every inch (or other selected width) in a manner that results in a half- or part-circle or arc having a series of flat portions rather than a smooth curve. However, other manufacturing techniques and/or materials are possible and are included within the scope of this disclosure (see, e.g., FIGS. 7C and 7D). Each of deflectors 105A, 105B, 110 can be made from a separate piece of metal, with internal deflectors 135 being part of and extending from deflectors 105A, 105B, 110. In this embodiment, when the deflectors 105A, 105B, 110 are made, the last bend will result in the formation of internal deflector 135 (see, e.g., FIGS. 8A, 8B, 8C, 9A, 9B, 9C).

The optional internal deflector/s 135 is/are coupled to, or extension of, the two side deflectors 105A, 105B and the top deflector 110. As previously mentioned, the internal deflector 135, and deflectors 105A, 105B, and 110 are usually made from metal. The internal deflector 135 is an added feature whose purpose is to further direct the tree limbs into the mouth or chute of the woodchipper, and to close any gaps that may be present between the adapter system 101 and the mouth or chute of the woodchipper. All of the deflectors 105A, 105B, 110, 135 are usually coupled together as illustrated by connection devices, such as welds. However, other connection devices besides welds are possible and include, but are not limited to, fasteners like bolts, rivets, screws, and the like.

Referring now to FIG. 1B, this figure is a right side view of the adapter system 101 shown in FIG. 1A according to one exemplary embodiment of the inventive system 101. The right deflector 105B may further comprise reinforcing struts 125B, 125C as well as leg retention members 130A, 130B. The top deflector 110 also may be provided with a reinforcing strut 125A. The internal deflector 135 may further comprise stops 180 as horizontal components welded to the internal deflector 135 to transfer the load from the adapter system 101 to the chipper chute (the face of the chipper) when a limb contacts the adapter system 101. The internal deflector 135 also may further comprise strengthening bars 182 to help prevent internal deflector 135 from bending or flexing when a limb contacts internal deflector 135. Stops 180 and strengthening bars 182 can be sized and located for each or different brands and/or models of chippers.

The reinforcing struts 125 may comprise cylindrical members that strengthen front contact surfaces of the top deflector 110 and the right deflector 105B that may come in contact with tree limbs, branches, trunks, etcetera. As shown in FIG. 1B, reinforcing struts 125 can be located entirely within each deflector 105A, 105B, 110. In this embodiment, reinforcing struts 125 are welded within deflectors 105A, 105B, 110 and extend from on outer region to an inner region of the inner surface of the respective deflector 105A, 105B, 110. Alternatively, any or all of reinforcing struts 125 can extend from an outer portion of deflector 105A, 105B, 110 to internal deflector 135. In this alternative embodiment, reinforcing struts 125 are welded to an outer region of the inner surface within deflectors 105A, 105B, 110 and extend across the width of the deflector 105A, 105B, 110 to the respective internal deflector 135, and are welded to the respective internal deflector 135.

Figure 7C:
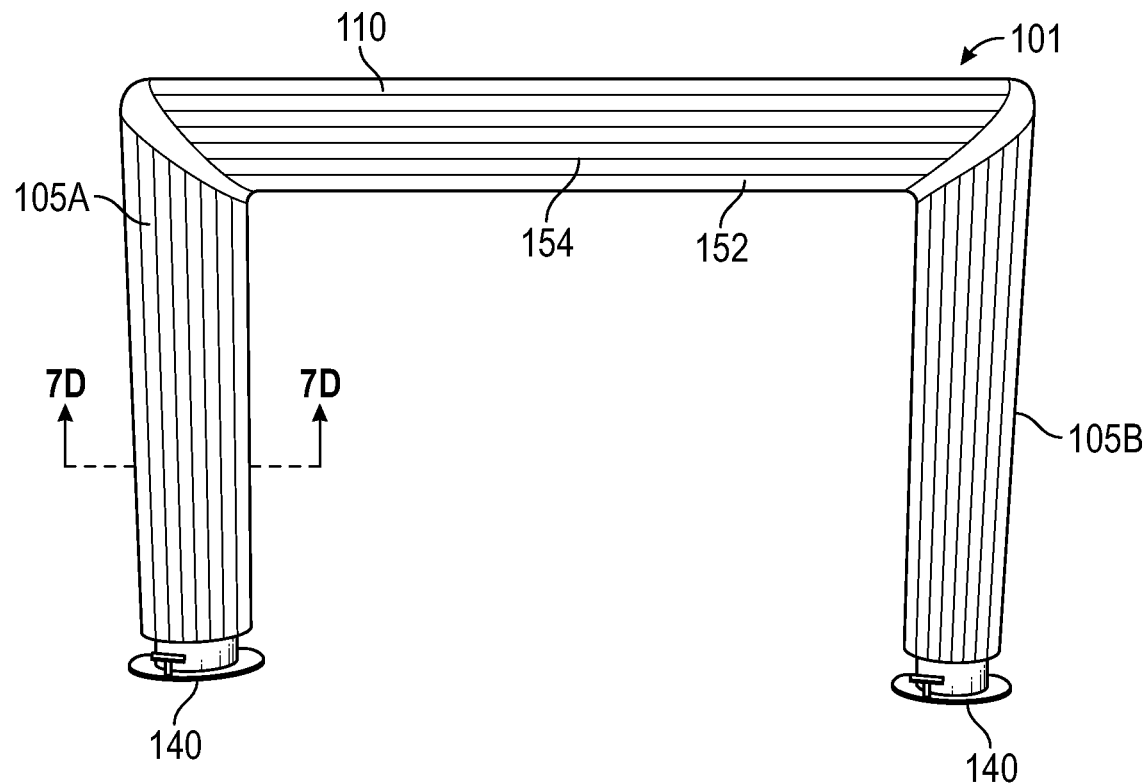
FIG. 7C is a front view of the adapter device of FIG. 1A with a bent metal shaped structure.
Figure 7D:
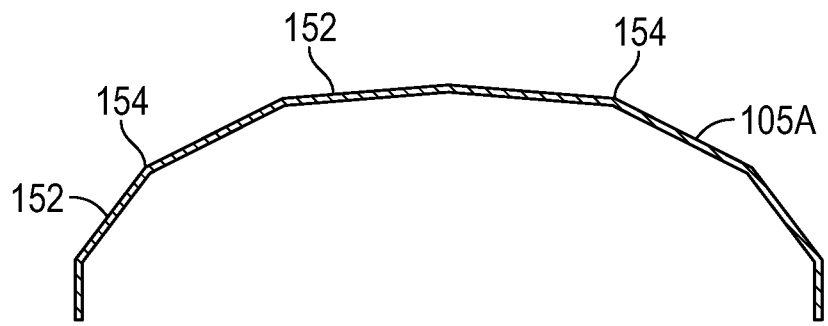
FIG. 7D is a cross-section of the left side deflector of the adapter device of FIG. 7C along line C'-C'.

The leg retention members 130A, 130B may comprise half-circle shaped structures that match or cooperate with the cross-sectional geometry of the right or left deflector 105B, 105A, whether the deflector 105B, 105A is a smooth shaped structure or a bent metal shaped structure (see FIGS. 7C and 7D). Each leg retention member 130A, 130B may comprise an opening or aperture 132.

A first leg retention member 130A having a first aperture 132A and a second leg retention member 130B having a second aperture 132B may receive a fixed, telescoping support holder 136. The fixed, telescoping support holder 136 is welded to the first leg retention member 130A and second leg retention member 130B. The fixed, telescoping support holder 136 penetrates through both of the first and second apertures 132A, 132B of the first and second leg retention members 130A, 130B. The fixed, telescoping support holder 136 comprises its own aperture 138 that corresponds with the apertures 122B of the right leg 120B. The right leg 120B telescopes/passes through the fixed telescoping support holder 136 in order to raise/lower the right leg 120B.

A pin 149 (not shown, but see FIG. 2C) may penetrate through the aperture 138 of the telescoping support holder 136 and through a corresponding aperture 122 of the right leg in order to lock/fix the right leg 120B at particular height/length. As illustrated in FIG. 1B, the cross-sectional geometry of the right leg 120B and the fixed telescoping holder 136 are shown to be a substantially square shape. Other cross-sectional shapes are possible, and include, but are not limited to, rectangular, circular, triangular, pentagonal, octagonal, etcetera, just to name a few. Generally, the cross-sectional geometry of the fixed telescoping support holder 136 will generally correspond/match with the cross-sectional geometry of the leg 120 in order to provide the telescoping action/extension for the legs 120. Usually, the diameter/cross-sectional area for the fixed telescoping support holder 136 is larger than the diameter/cross-sectional area of each leg 120.

Each leg 120 may comprise a foot member 140. The foot member 140, as illustrated, comprises a planar disc for contacting the ground. However, other shapes for the foot member 140 are possible and included within the scope of this disclosure. For example, other shapes include, but are not limited to, square, rectangular, triangular, elliptical, pentagonal, octagonal, etcetera.

The chipper coupling mechanism 115B is shown connected to a coupling arm 122B. The coupling arm 122B is coupled to a mounting plate 134 which is coupled to the right side deflector 105B. The chipper coupling mechanism 115 attaches to portions of the woodchipper 400 (not shown, but see FIG. 4A) during operational use of the adapter system 101 as well as during non-operational use (i.e. during transport of the adapter system 101). The chipper coupling mechanism 115B further comprises an aperture 117B. Further details of the chipper coupling mechanism 115B will be described below in connection with FIGS. 2C-2D.

Figure 1C:
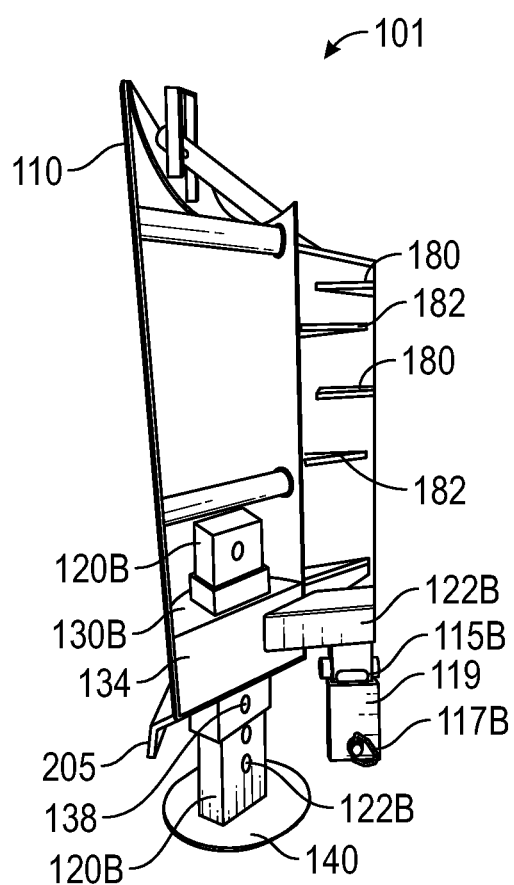
FIG. 1C illustrates a right side view of the adapter device shown in FIG. 1B, but with the leg contracted/telescoped upward, into the adapter device.

Referring now to FIG. 1C, this figure illustrates a right side view of the adapter system 101 shown in FIG. 1B but with the leg 120 retracted/telescoped upward, into the adapter system 101. FIG. 1C is substantially similar to FIG. 1B, so only the differences will be described for this figure.

As shown by the two directional upward arrows relative to the page, the leg 120B has been retracted within/telescoped upward into the adapter system 101. In this FIG. 1C, the leg 120B now passes behind mounting plate 134 and through the leg retention member 130B via aperture 132B. Specifically, the leg 120B may slide through the fixed, telescoping support holder 136 and through aperture 132B of the leg retention member 130B, while passing behind mounting plate 134.

The leg 120B may be held in the position shown in FIG. 1C by a pin 149 (not visible, but see FIG. 2C) which may penetrate/pass through the aperture 138 of the fixed telescoping support holder 136. In this way, the legs 120 of the adapter system 101 may be adjusted to different ground heights on which the feet 140 may be placed. The legs 120 may also be retracted when the adapter system 101 is ready for a transport mode (and not in an operational state).

Figure 1D:
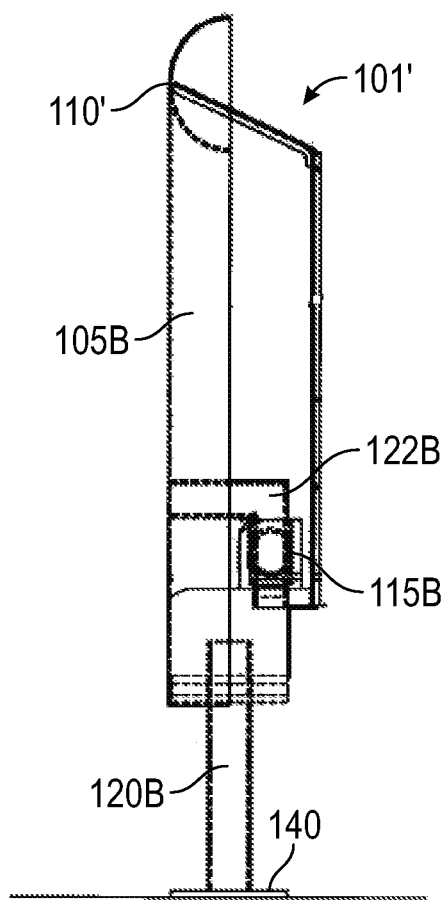
FIG. 1D illustrates a side view of an adapter device of an alternate exemplary embodiment.

Referring now to FIG. 1D, this figure illustrates a side view of an adapter system 101' of an alternate exemplary embodiment. According to this alternate exemplary embodiment the top deflector 110' has a semi-circular cross section, compared to the slightly curved cross-section of the top deflector 110' shown in FIG. 1C.

The top deflector 110' also may be constructed from steel pipe, as disclosed previously, according to this exemplary embodiment. The top deflector 110' also may be formed from a sheet of metal by bending the sheet of metal every inch (or other selected width) in a manner that results in a half- or part-circle or arc having a series of flat portions rather than a smooth curve, also as disclosed previously. Other parts, such as legs 120 and feet 140 as well as the chipper coupling mechanism 115B may be the same relative to the exemplary embodiment illustrated in FIGS. 1A, 1B, and 1C and described above.

Figure 2B:
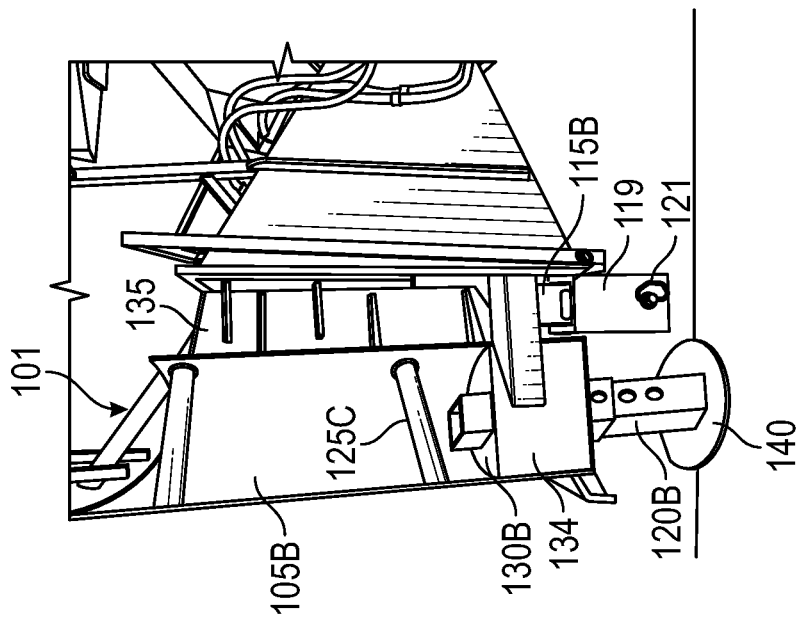
FIG. 2B illustrates a side view of the adapter device and system shown in FIG. 2A where the adapter device is positioned in front of a chute of the woodchipper.
Figure 2A:
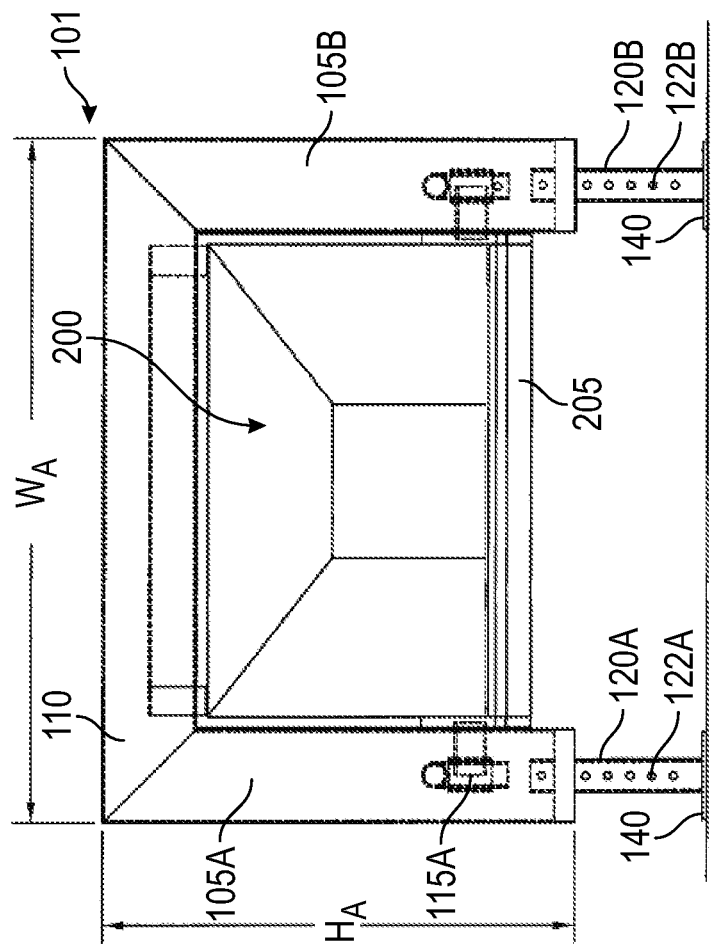
FIG. 2A illustrates an exemplary system with an adapter device positioned in front of a mouth or chute of a woodchipper.
Figure 4A:
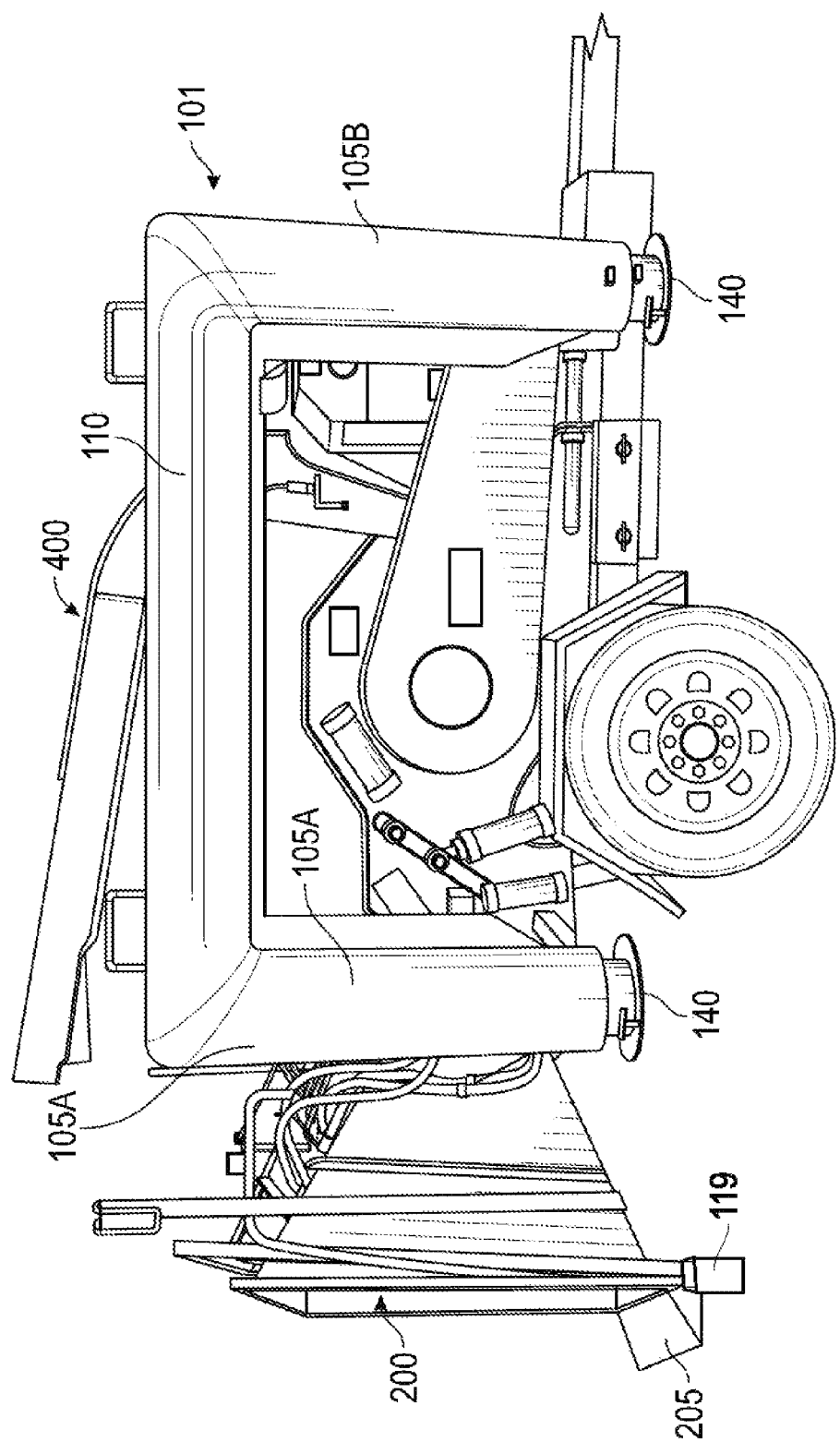
FIG. 4A illustrates the adapter device and system in a non-operational state or transport mode in which the adapter device and system may be mounted on a side portion of a woodchipper.

Referring now to FIG. 2A, this figure illustrates the adapter system 101 positioned in front of a chute 200 of a woodchipper 400 (shown in FIG. 4A). The chute 200 may further comprise a lower landing surface 205. As visible in FIG. 2A, the lower landing surface 205 of the chute 200 aligns with lower portions of the two side deflectors 105A, 105B.

Referring now to FIG. 2B, this figure illustrates a side view of the adapter system 101 shown in FIG. 2A where the adapter system 101 is positioned in front of a chute 200 of the woodchipper 400. In this figure, the chipper coupling mechanism 115B of the adapter system 101 is attached to a chipper receiver 119. The chipper receiver 119 may comprise a sleeve which receives chipper coupling mechanism 115B. The chipper receiver 119 may be permanently attached to a side of the chute 200 as will be described below. The sleeve 119 may comprise an aperture that aligns with the aperture 117B of the chipper coupling mechanism 115B described previously.

The aperture of the chipper receiver 119 may receive a pin 149 which has a handle 121 as illustrated in FIG. 2B. This pin 149 with handle 121 may penetrate through both the aperture of the chipper receiver 119 and the aperture 117B of the chipper coupling mechanism 115B. The chipper coupling mechanism 115B and chipper receiver 119 lock each side deflector 105 in position such that the adapter system 101 is in a fixed position relative to the chute 200 of the woodchipper 400. In this locked position, the internal deflector 135 may have direct physical contact with a periphery of the chute 200 of the woodchipper 400 by way of the stops 180, which typically are specific for each brand of chipper.

Figure 2D:
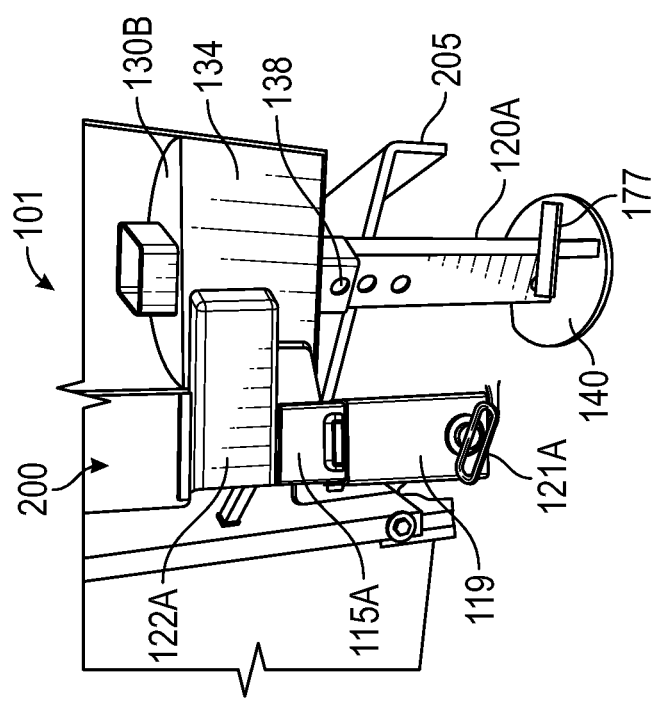
FIG. 2D illustrates a close-up left side view of the adapter device and system and chute as shown in FIG. 2A.
Figure 2C:
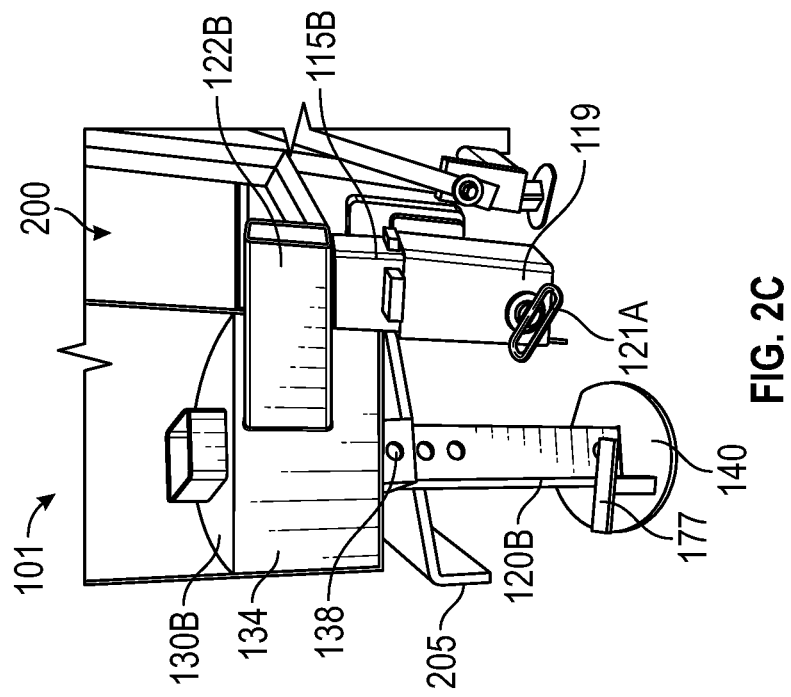
FIG. 2C illustrates a close-up right side view of the adapter device and system and chute as shown in FIG. 2B.

Referring now to FIG. 2C, this figure illustrates a close-up right side view of the adapter system 101 and chute 200 as shown in FIG. 2B. As visible in this figure, each pin 149 may have a handle 121, wherein each pin 149 comprises a cylinder which may be positioned in the hole 138 of the fixed, telescoping support holder 136. As shown in FIG. 2C, a pin 149A (not visible) with handle 121A has been positioned in the aperture 133 (not visible, but see FIG. 2D) of the sleeve 119 and the aperture 117B (not visible) of the chipper coupling mechanism 115B. As shown in FIG. 2C, each foot 140 may be provided with a handle 177 for ease of expanding and retracting each leg 120 within a respective side deflector 105.

Referring now to FIG. 2D, this figure illustrates a close-up left side view of the adapter system 101 and chute 200 as shown in FIG. 2A. FIG. 2D is substantially similar to FIG. 2C so only the differences between the two figures will be explained here. In this FIG. 2D, the aperture 133 of sleeve 119 which receives the chipper coupling mechanism 115A is now visible. This aperture 133 of sleeve 119 aligns with the aperture 117 of the chipper coupling mechanism 115. When a pin 149 is positioned in the apertures 133, 117, this locks the chipper coupling mechanism 115 within the sleeve 119.

Figure 3A:
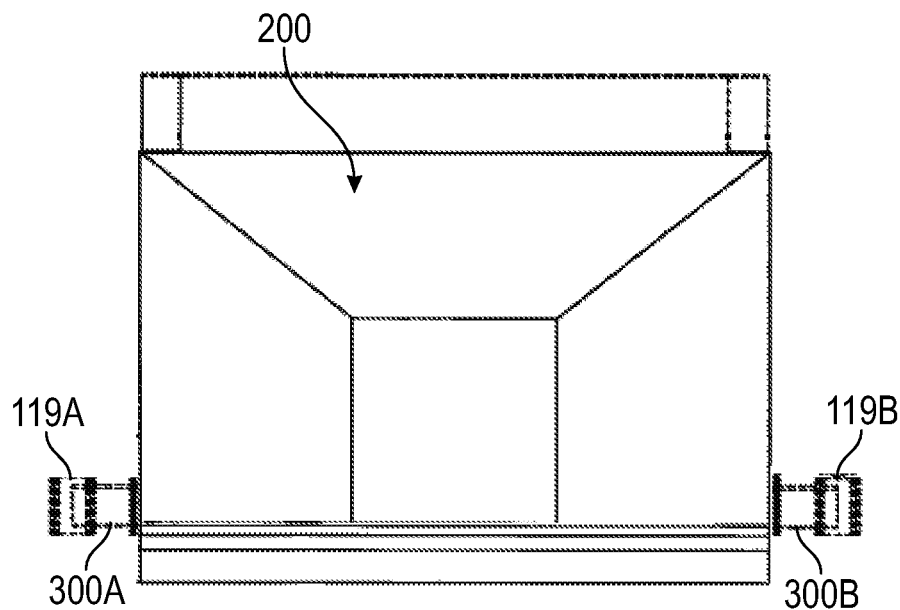
FIG. 3A illustrates a front view of a mouth or chute of a woodchipper which has two sleeves for receiving chipper coupling mechanisms.

Referring now to FIG. 3A, this figure illustrates a front view of a chute 200 of a woodchipper 400 (see FIG. 4A) that has two sleeves 119A, B for receiving chipper coupling mechanisms 115 (not shown). As illustrated each sleeve 119A, 119B is coupled to the chute 200 by respective mounts 300A, 300B. According to an exemplary embodiment, these mounts 300A, 300B are welded to the chute 200. However, other fastening mechanisms may be employed, such as, but not limited to, bolts, rivets, screws, and other like fasteners. Each sleeve 119A, 119B is also welded to each mount 300A, 300B according to an exemplary embodiment; however, other fastening mechanisms may be employed as discussed above.

Figure 3B:
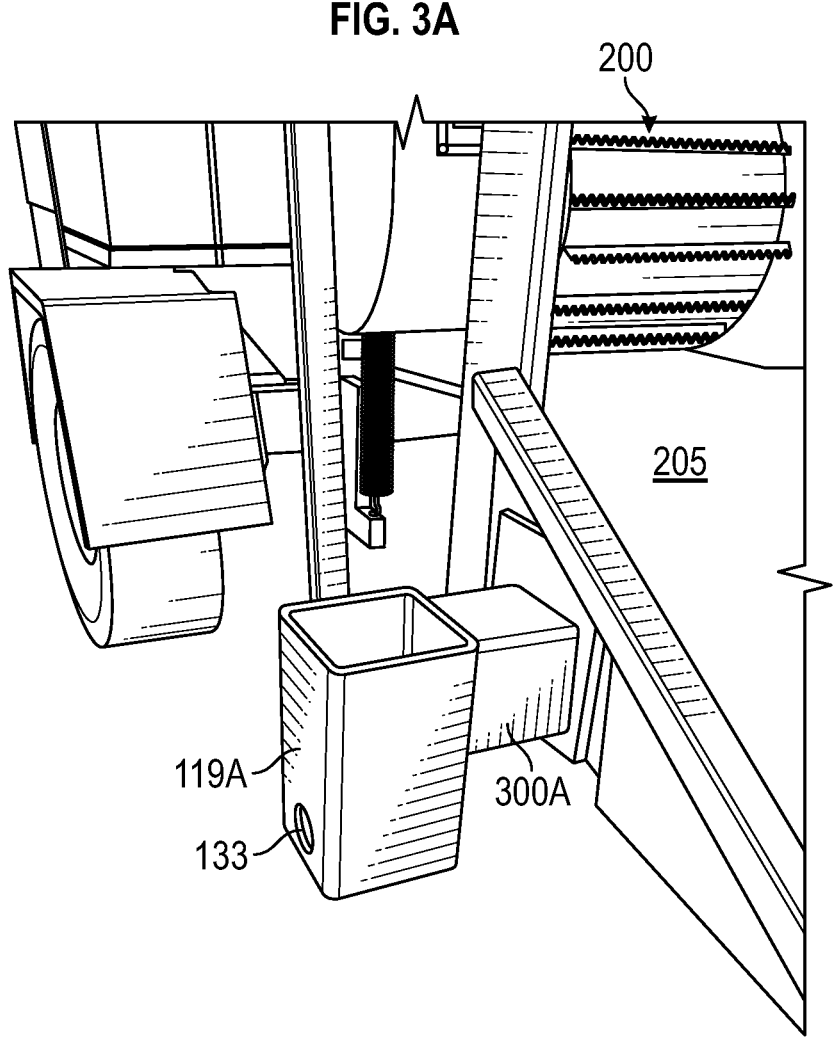
FIG. 3B illustrates a close-up view for the left mount and left sleeve shown in FIG. 3A according to one exemplary embodiment.

Referring now to FIG. 3B, this illustrates a close-up view for the left mount 300A and left sleeve 119A shown in FIG. 3A according to one exemplary embodiment. As shown, each sleeve 119 may comprise a rectangular or square cross-section; however, other shapes are possible and are included within the scope of this disclosure. Other shapes include, but are not limited to, circular, elliptical, triangular, pentagonal, octagonal, hexagonal, etcetera, just to name a few. The sleeve 119 generally has a cross-sectional shape which matches the cross-sectional shape of the chipper coupling mechanism 115 (not shown) described above.

Referring now to FIG. 4A, this figure illustrates the adapter system 101 in a non-operational state or transport mode in which the adapter system 101 may be mounted on a side portion of a woodchipper 400. Further details of how the adapter system 101 during a transport mode may be mounted to the side portion of the woodchipper 400 will be described below in connection with FIGS. 4B-4D.

Figure 4C:
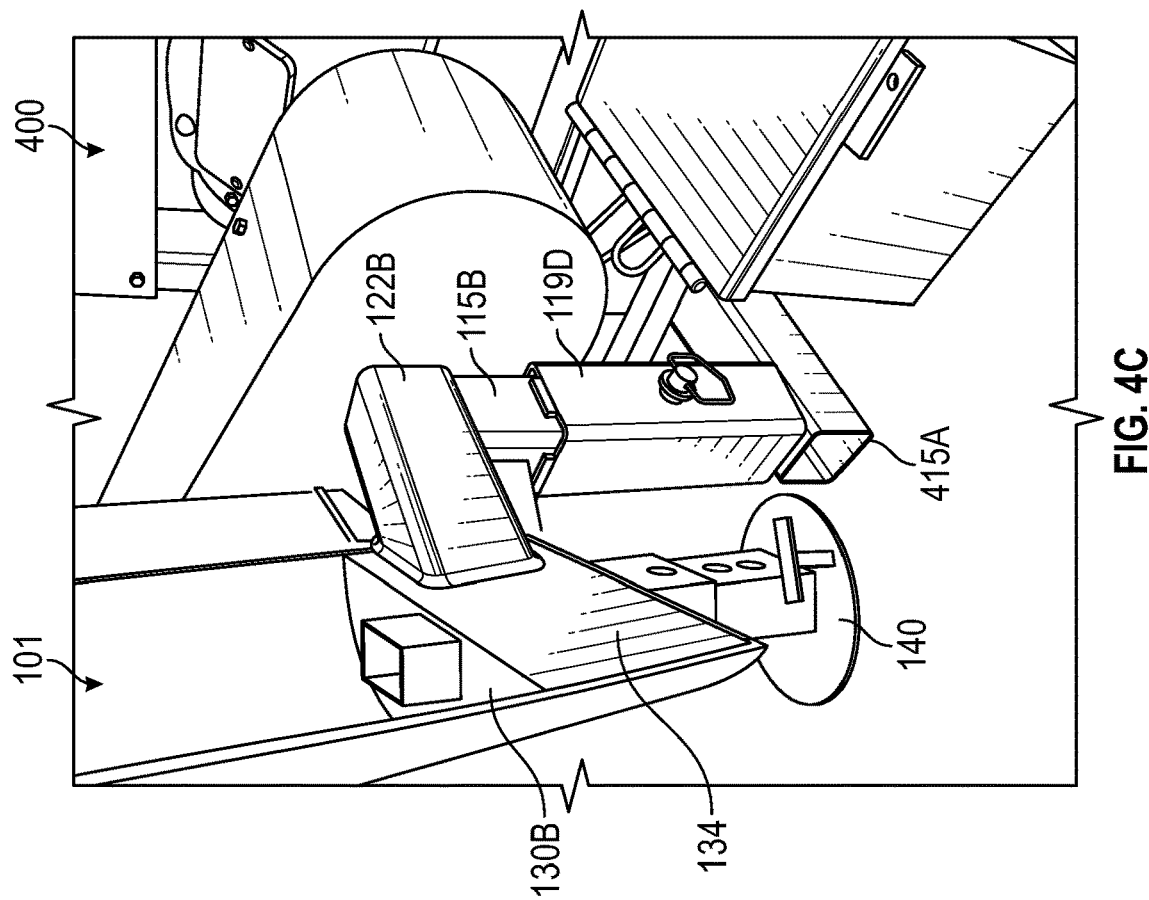
FIG. 4C is a close-up view of the side view shown in FIG. 4B.
Figure 4B:
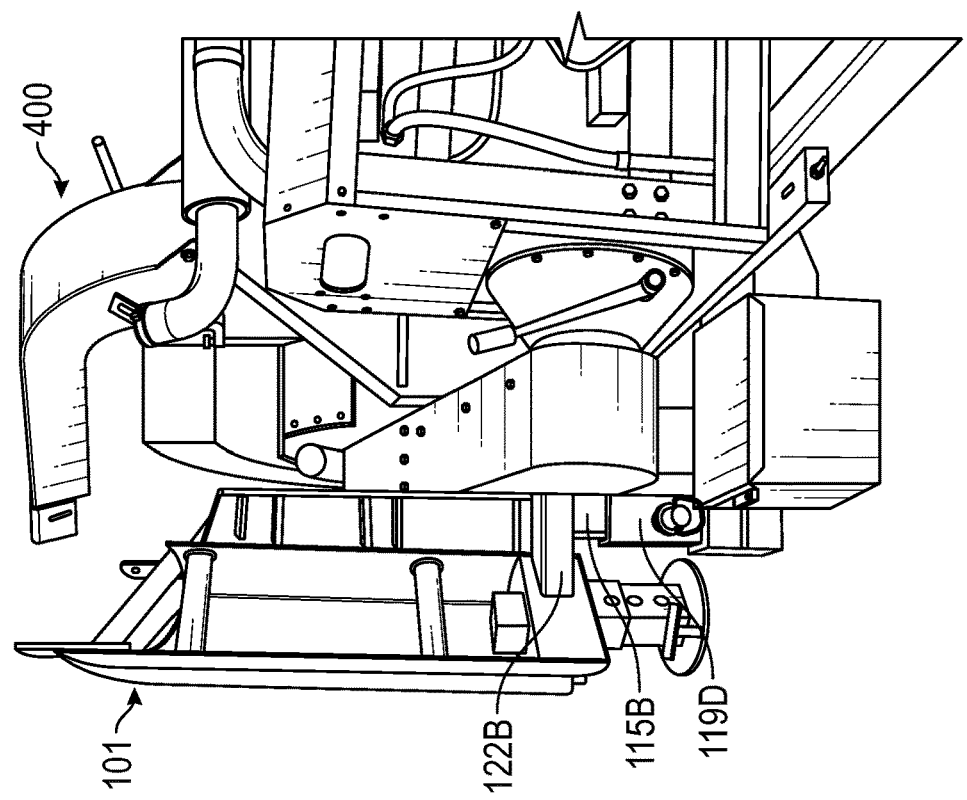
FIG. 4B illustrates an exemplary side view of the adapter device and system while in transport mode when it is attached to a side portion of a woodchipper.

Referring now to FIG. 4B, this figure illustrates an exemplary side view of the adapter system 101 while in transport mode when it is attached to a side portion of a woodchipper 400. According to one exemplary embodiment, the chipper coupling mechanisms 115 may be used with additional sleeves 119 that are positioned on the side portion of the woodchipper 400.

Referring now to FIG. 4C, this figure is a close-up view of the side view shown in FIG. 4B. As shown in this figure, an additional sleeve 119D is provided on a side portion of a woodchipper 400. The sleeve 119D may be mounted on a support beam 415A that extend from a side portion of the woodchipper 400.

Figure 4D:
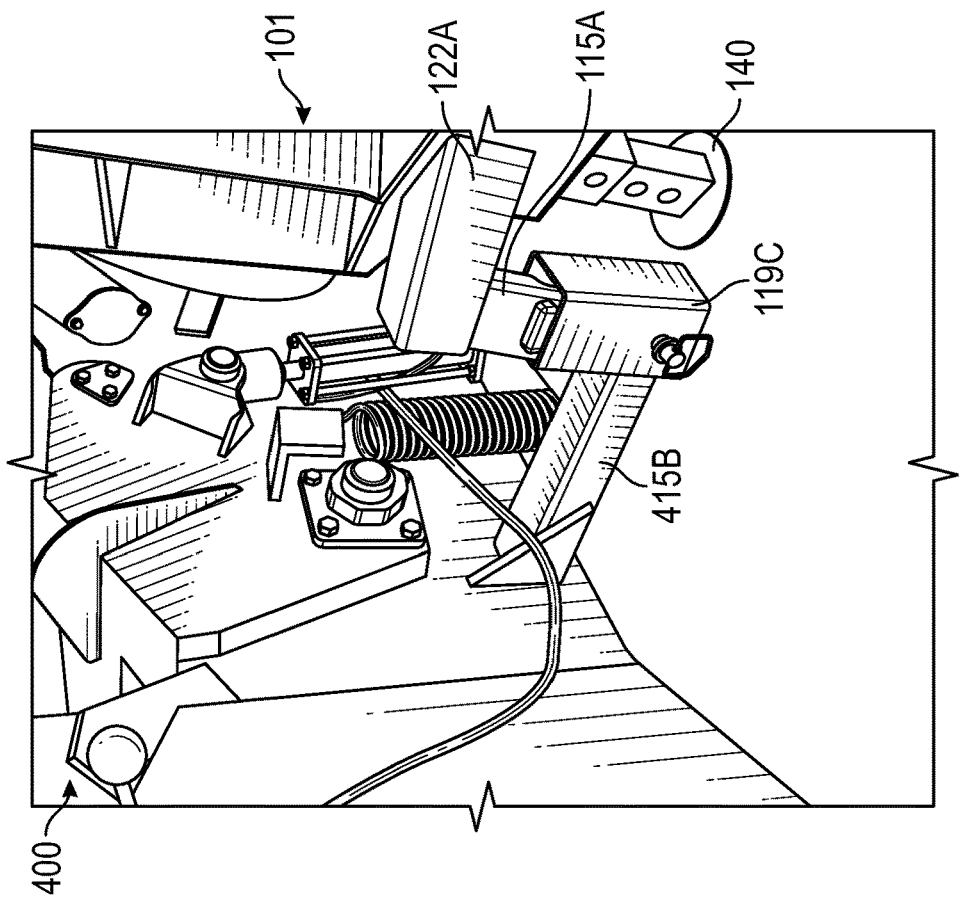
FIG. 4D is a close-up side view for the left side of the adapter device and system as illustrated in FIG. 4A while the device and system is in a transport mode.

Referring now to FIG. 4D, this figure is a close-up side view for the left side of the adapter system 101 as illustrated in FIG. 4A while the system 101 is in a transport mode. FIG. 4D is substantially similar to FIG. 4C. In this FIG. 4D, another support beam 415B extends from the woodchipper 400 for the support sleeve 119C which engages the chipper coupling mechanism 115A. The support sleeve 119C keeps the adapter system 101 firmly in place while it is in a transport mode.

Figure 5A:
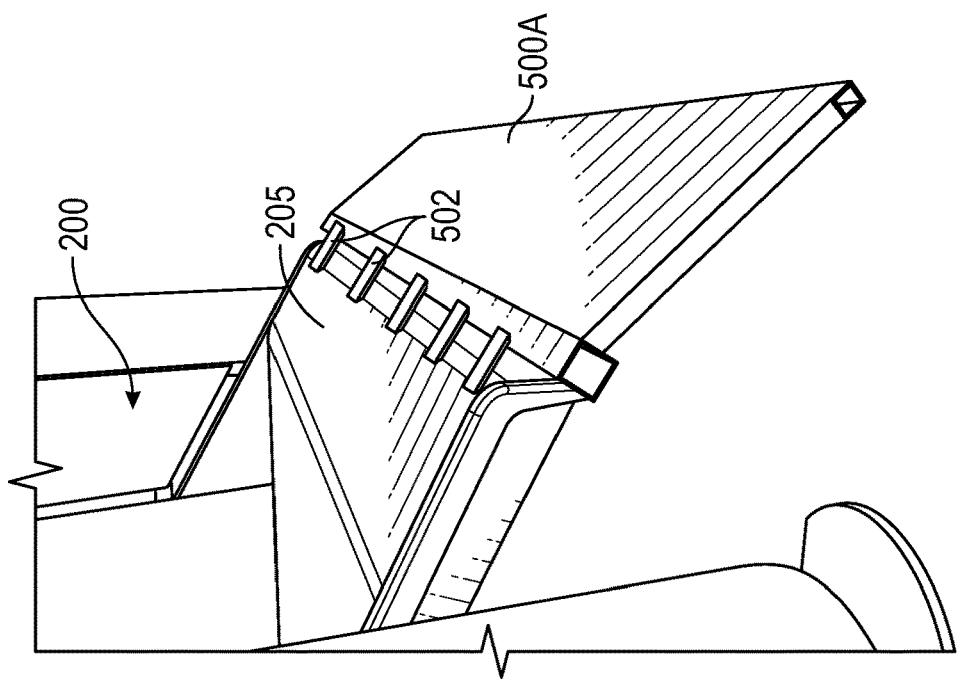
FIG. 5A illustrates an alternative exemplary embodiment for the mouth or chute of the woodchipper in which the mouth or chute comprises a first extender.

Referring now to FIG. 5A, this figure illustrates an alternative exemplary embodiment for the mouth or chute 200 of the woodchipper 400 in which the chute 200 comprises a first extender 500A. The chute 200 may comprise a landing surface 205 and this landing surface 205 may be extended with a first extender 500A. The first extender 500A may be fastened to the landing surface by one or more welds 502. However, other fastening devices besides welds 502 may be employed. Other fastening devices include, but are not limited to, rivets, screws, hinge joints, chain links, etcetera and the like.

Figure 5B:
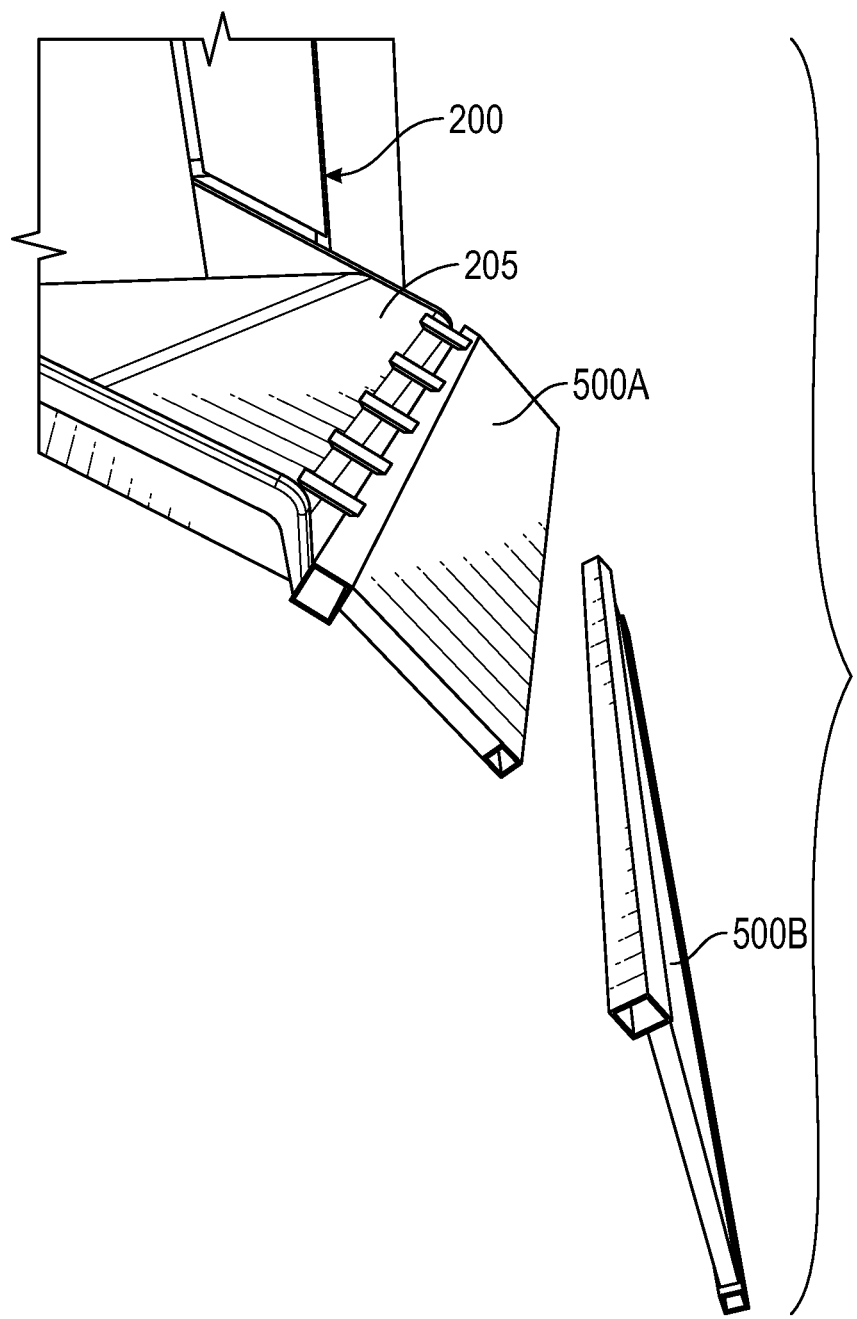
FIG. 5B illustrates an alternative exemplary embodiment for the mouth or chute of the woodchipper in which the mouth or chute comprises both a first extender and a second extender.

Referring now to FIG. 5B, this figure illustrates an alternative exemplary embodiment for the mouth or chute 200 of the woodchipper 400 in which the chute 200 comprises a first extender 500A and a second extender 500B. FIG. 5B is substantially similar to FIG. 5A. However, the fastening devices for the second extender 500B are not shown/visible. Any number or a combination of fastening devices described above may be employed and will fall within the scope of this disclosure.

Figure 6A:
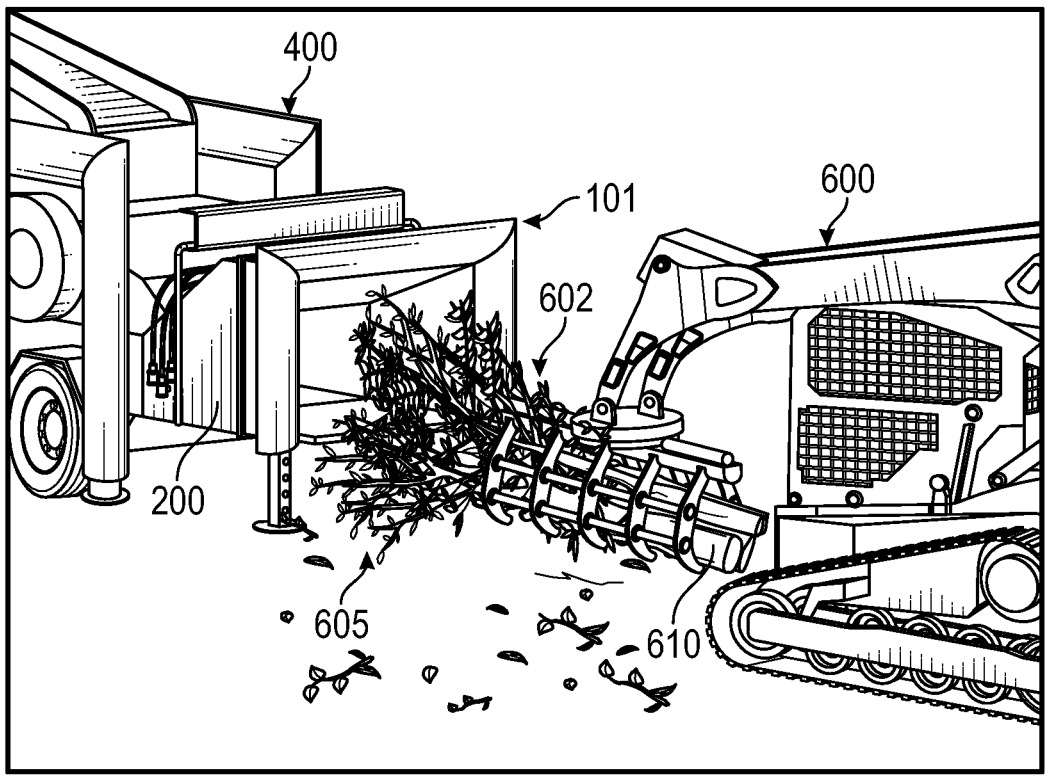
FIG. 6A illustrates the adapter device and system in an operational mode and fixed against a chute of a woodchipper according to an exemplary embodiment and method.

Referring now to FIG. 6A, this figure illustrates the adapter system 101 in an operational mode and fixed against a mouth or chute 200 of a woodchipper according to an exemplary embodiment. A machine 600 for handling a cut tree 602 is feeding a cut tree 602 into the chute 200 of the woodchipper 400. The cut tree 602 has limbs 605 and a trunk 610.

As shown in FIG. 6A, the machine 600 feeds the cut tree 602 into the chute 200 of the woodchipper 400 in a leaf-to-limb or thinner-to-thicker limb manner (inverted/reverse) manner. However, the machine 600 could easily feed the cut tree 602 in a limb-to-leaf or thicker-to-thinner limb manner (normal/forward) manner. The top and side deflectors of the adapter system 101 adapts/channels/funnels the limbs 605 and trunk 610 into the chute 200 of the woodchipper 400. In this way, direct human feeding of the cut tree 602 into the chute 200 is substantially eliminated. Also, in this way, the cut tree 602 may be fed into the woodchipper 400 in any direction with the adapter system 101 being of sufficient strength and shape to properly direct the cut tree 602 into the woodchipper 602. The system 101 thus guides the cut tree 602 into the chute 200 and protects the components of the woodchipper 400 from being contacted and/or damaged by the cut tree 602.

Figure 6B:
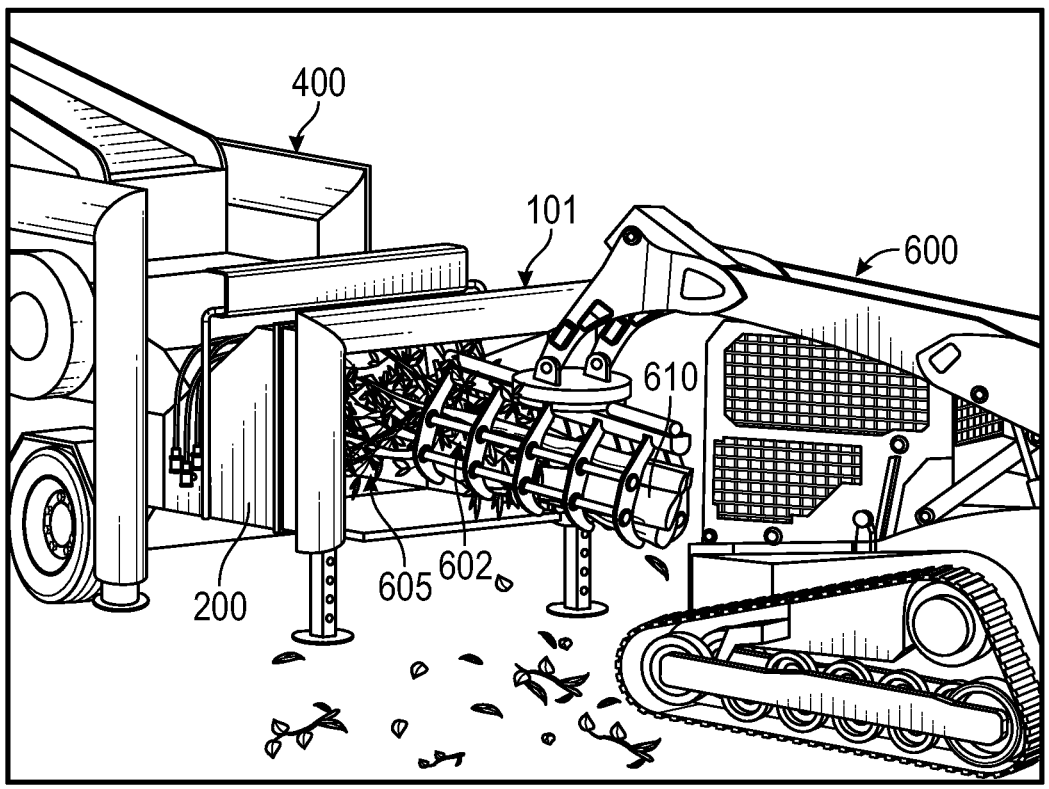
FIG. 6B illustrates the adapter device and system of FIG. 6A but after the cut tree has been fed further into the chute of the woodchipper.

Referring now to FIG. 6B, this figure illustrates the adapter system 101 of FIG. 6A but after the cut tree 602 has been fed further into the mouth or chute 200 of the woodchipper 400. FIG. 6B is substantially similar to FIG. 6A, so only the differences between the two figures will be described here. In this FIG. 6B, the top and side deflectors of the adapter system 101 have further bent/folded/channeled/funneled the limbs 605 into the chute 200 of the woodchipper 400. As apparent from this figure, the machine 600 may completely feed the cut tree 602 into the chute 200 without any direct contact from a human.

FIG. 7A is a front view of the adapter system 101 of FIG. 1A with a smooth curved structure, and FIG. 7B is cross-section of the adapter system of FIG. 7A along line A'-A'. In this embodiment, the adapter system 101 top branch deflector 110 and two side branch deflectors 105A, 105B are shown as half-pipe components having a semi-circular structure, which can be formed by cutting a circular pipe axially in half. The pipe can be cut along any suitable chord, so as to result in more or less than a half-circle cross-section of the top branch deflector 110 and the two side branch deflectors 105A, 105B.

FIG. 7C is a front view of the adapter system of FIG. 1A with a bent metal shaped structure, and FIG. 7D is a cross-section of the adapter system of FIG. 7C along line C'-C'. In this embodiment, the adapter system 101 top branch deflector 110 and two side branch deflectors 105A, 105B are shown as sheets of metal (or other suitable material) having a plurality of lengthwise bends (axially in analogy to a pipe) so as to form a general equivalent of a semi-circular structure having flattened portions. The number of bends is not critical, but preferably is at least three, and more preferably at least five, and even more preferably between five and eleven, so as to allow the feeding of the tree limbs through the adapter system 101 without significant catching on the bends.

Figure 8A:
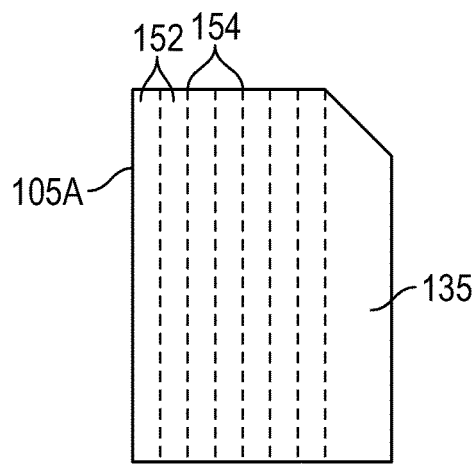
FIG. 8A is a schematic front view of a metal blank combining the left side deflector with an internal deflector prior to being bent into a final shape for the deflector.
Figure 8B:
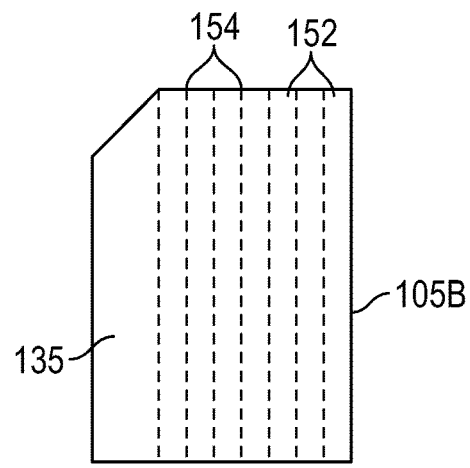
FIG. 8B is a schematic front view of a metal blank combining the right side deflector with an internal deflector prior to being bent into a final shape for the deflector.
Figure 8C:
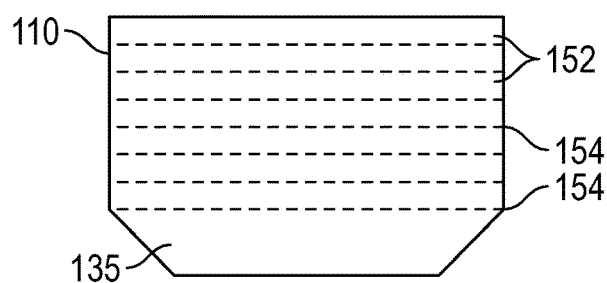
FIG. 8C is a schematic front view of a metal blank combining the top deflector with an internal deflector prior to being bent into a final shape for the deflector.

FIGS. 8A, 8B, and 8C show metal blanks for the deflectors 105A, 105B, 110, respectively, before bending showing how internal deflector 135 is a part of the blank for the respective deflector 105A, 105B, 110. As an alternative to using steel pipes cut in half axially or longitudinally to form deflectors 105A, 105B, 110, as in FIGS. 7C and 7D, deflectors 105A, 105B, 110 deflectors 105A, 105B can be formed from sheets of metal (or other suitable material) having a plurality of lengthwise bends (axially in analogy to a pipe) so as to form a general equivalent of a semi-circular structure having flattened portions. The metal blanks can be bent along bend lines 154, shown as dashed lines, resulting in a series of flat portions 152 separated by the bends at bend lines 154, resulting in an arc-like configuration (see FIGS. 9A, 9B, 9C). Internal deflector 135 is formed from a last bend line 154.

Figure 9A:
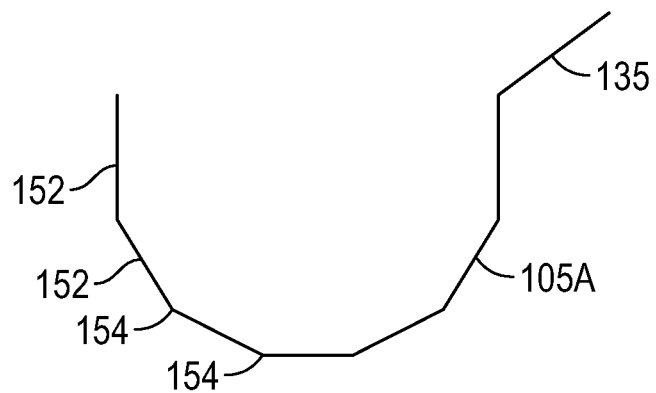
FIG. 9A is a schematic top view of the blank of FIG. 8A after being bent into the proper shapes for welding together to make the chipper adapter device.
Figure 9B:
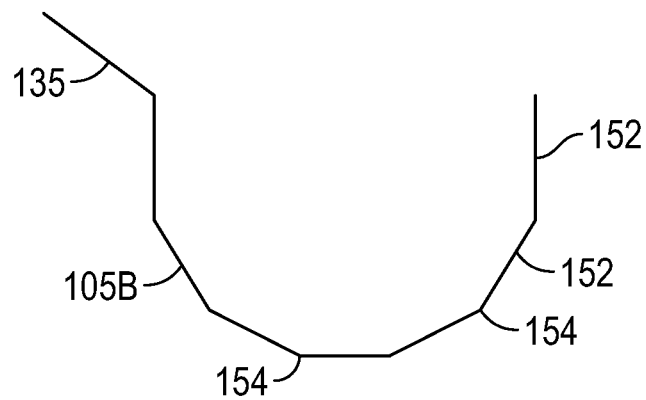
FIG. 9B is a schematic top view of the blank of FIG. 8B after being bent into the proper shapes for welding together to make the chipper adapter device.
Figure 9C:
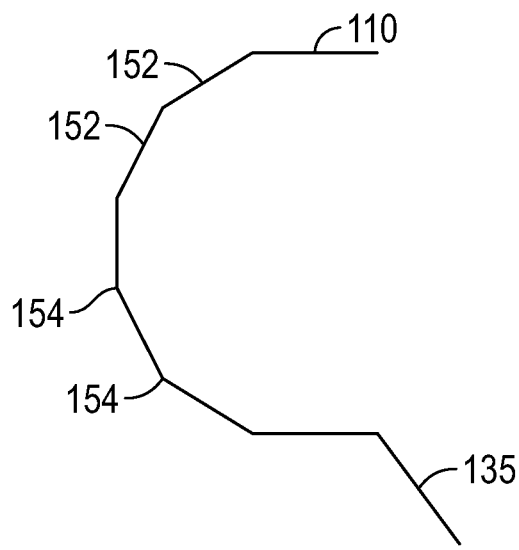
FIG. 9C is a schematic right side view of the blank of FIG. 8C after being bent into the proper shapes for welding together to make the chipper adapter device.

FIGS. 9A, 9B, and 9C show the blanks of FIGS. 8A, 8B, and 8C, respectively, bent into the proper shapes for welding together to make the chipper adapter system 101. Support struts 125 (not shown in FIG. 9A, 9B, or 9C) can be included from an inner region of the deflector 105A, 105B, 110 to the internal deflector 135 by welding the support struts 125 to the appropriate internal locations/surfaces of the deflectors 105A, 105B, 110 and internal deflectors 135. Deflectors 105A, 105B, 110 can then be welded together to form the adapter system 101. Edges of each of the blanks for deflectors 105A, 105B, 110, or the bent shapes, may be cut as necessary for a proper configuration and welding.

The various embodiments are provided by way of example and are not intended to limit the scope of the disclosure. The described embodiments comprise different features, not all of which are required in all embodiments of the disclosure. Some embodiments of the present disclosure utilize only some of the features or possible combinations of the features.

Variations of embodiments of the present disclosure that are described, and embodiments of the present disclosure comprising different combinations of features as noted in the described embodiments, will occur to persons with ordinary skill in the art. It will be appreciated by persons with ordinary skill in the art that the present disclosure is not limited by what has been particularly shown and described herein above. Rather the scope of the invention is defined by the appended claims.

In the claims, means-plus-function clauses are intended to cover the structures described herein as performing the recited function and not only structural equivalents, but also equivalent structures. Thus, it is the express intention of the applicant not to invoke 35 USC § 112(f) for any limitations of any of the claims herein, except for those in which the claim expressly uses the words "means for" together with an associated function.

Therefore, although selected aspects have been illustrated and described in detail, it will be understood that various substitutions and alterations may be made therein without departing from the spirit and scope of the present invention, as defined by the following claims.

What is claimed is:

1. An adapter system comprising:
   a first side deflector;
   a second side deflector;
   a top deflector coupled to the first side deflector and the second side deflector;
   a first leg coupled to the first side deflector; and
   a second leg coupled to the second side deflector,
   wherein the legs are adjustable between a first position and a second position,
   wherein the first side deflector, the second side deflector, and the top deflector define an entrance region for channeling wood-based debris, and
   wherein each side deflector comprises a coupling mechanism for attaching to a woodchipper.

2. The adapter system of claim 1, wherein each coupling mechanism comprises an aperture.

3. The adapter system of claim 1, wherein each leg telescopes within a respective side deflector.

4. The adapter system of claim 3, wherein each leg comprises a plurality of apertures.

5. The adapter system of claim 3, wherein each leg is received by a fixed, telescoping support holder.

6. The adapter system of claim 5, wherein each fixed, telescoping support holder comprises an aperture, wherein the aperture of each fixed, telescoping support holder aligns with an aperture present within a leg.

7. The adapter system of claim 1, further comprising an internal deflector coupled to the first side deflector, the second side deflector, and the top deflector.

8. The adapter system of claim 1, wherein the first side deflector, the second side deflector, and the top deflector comprise a curved surface.

9. The adapter system of claim 1, wherein the first side deflector, the second side deflector, and the top deflector are formed from a sheet of metal by bending the sheet of metal in a manner that results in a half- or part-circle or arc having a series of flat portions.

10. The adapter system of claim 1, wherein each leg is received by a respective fixed, telescoping support holder which is present within each side deflector.

* * * * *